C. M. DODSON.
TRACTOR PLOW.
APPLICATION FILED FEB. 15, 1917.
1,324,387.
Patented Dec. 9, 1919.
2 SHEETS—SHEET 1.
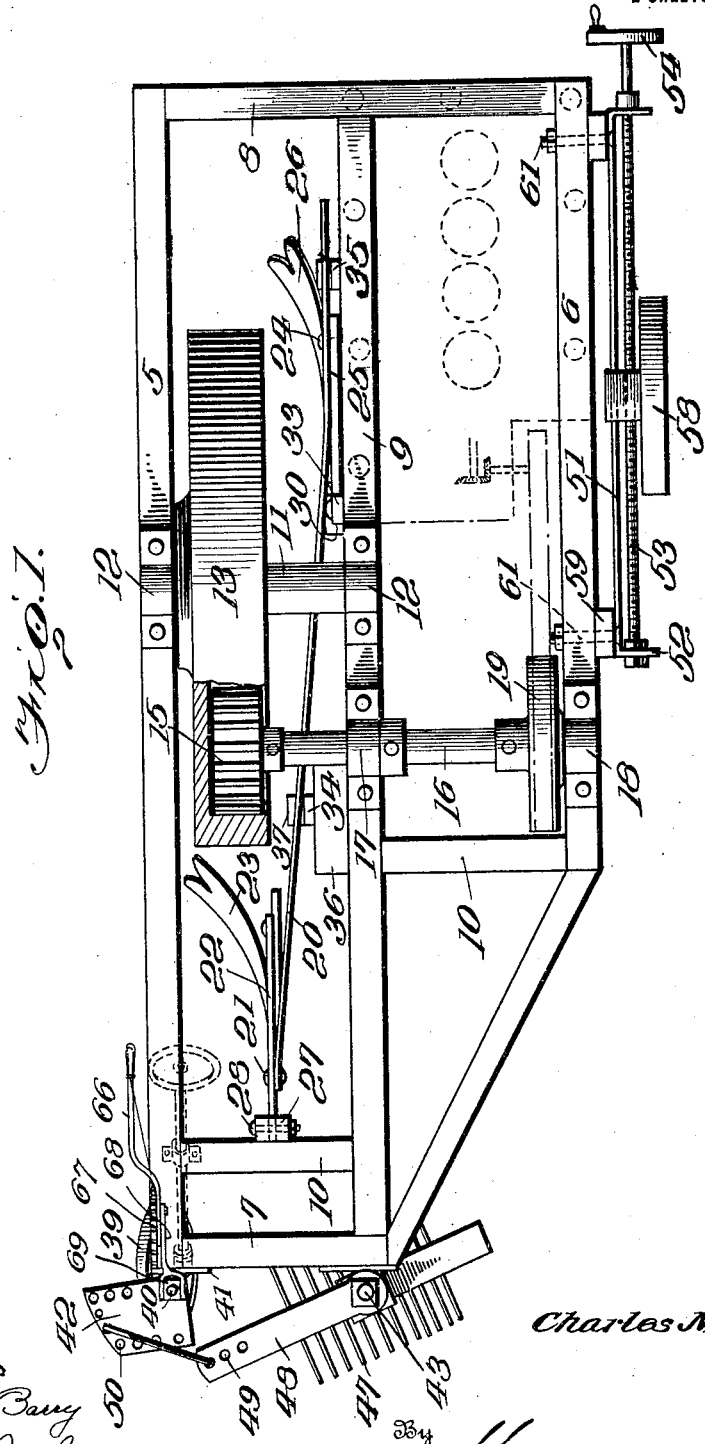
Inventor
Charles M. Dodson.
Witnesses
F. C. Barry
W. E. Beck
By Munn & Co.
Attorneys

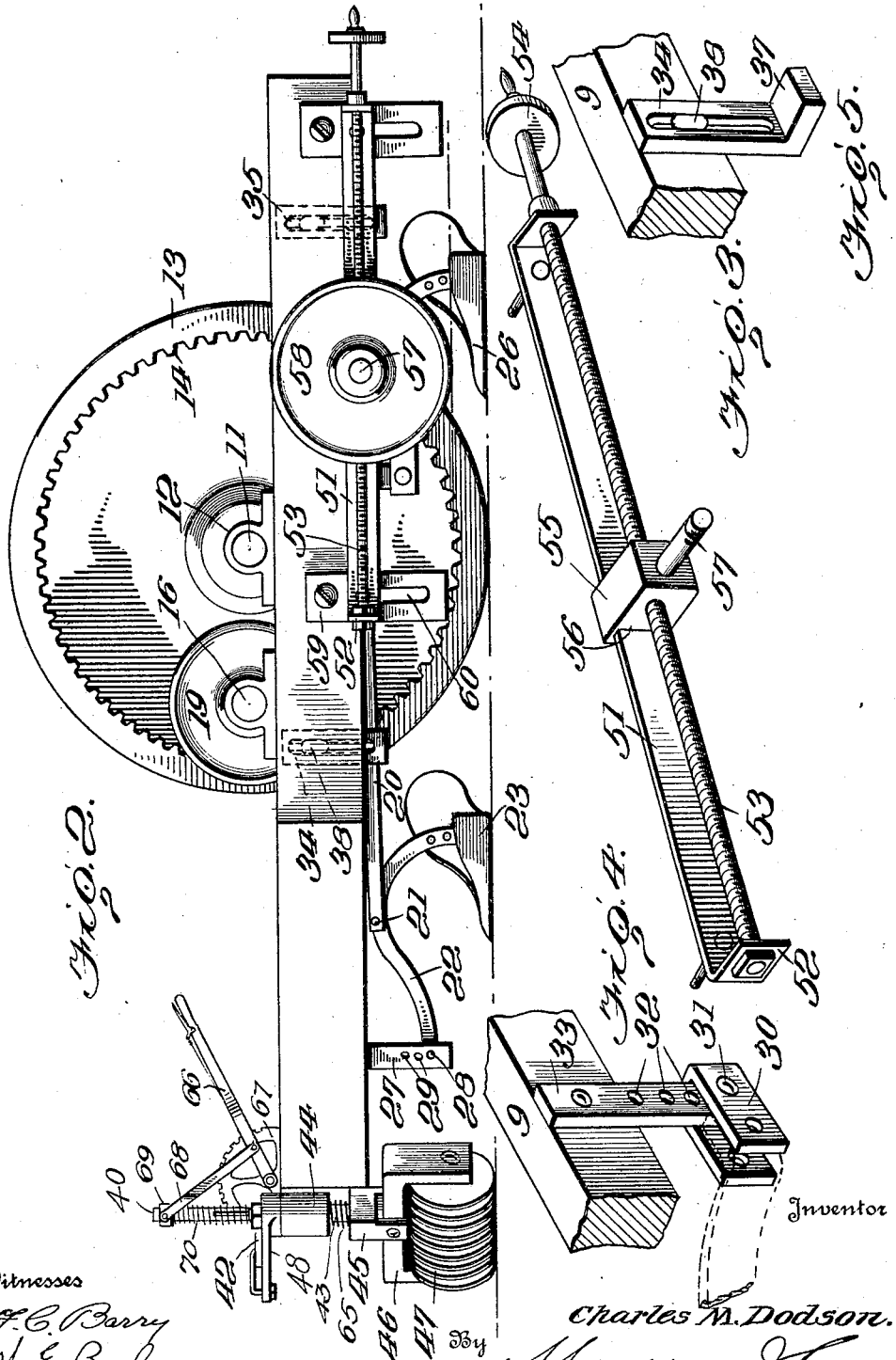

UNITED STATES PATENT OFFICE.

CHARLES MOSS DODSON, OF KIRKSVILLE, MISSOURI.

TRACTOR-PLOW.

1,324,387.  Specification of Letters Patent.  Patented Dec. 9, 1919.

Application filed February 15, 1917. Serial No. 148,744.

*To all whom it may concern:*

Be it known that I, CHARLES M. DODSON, a citizen of the United States, and a resident of Kirksville, in the county of Adair and State of Missouri, have invented a certain new and useful Improvement in Tractor-Plows, of which the following is a specification.

One of the principal objects of my invention is to provide an improved plow of the tractor type, in which the plow points are arranged before and behind the single drive wheel, in such manner as to place practically all the load on the drive wheel, whereby to relieve the plow frame of strain, and to secure a more perfect traction.

Another object of the invention is to provide an improved means for shifting the weight both longitudinally and laterally.

A still further object of the invention is to provide an improved tractor plow of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a top plan view of a tractor plow constructed according to my invention;

Fig. 2 represents a side elevational view thereof;

Fig. 3 represents a view in perspective of the screw and traveler and the frame supporting the same, comprising a portion of the weight adjusting mechanism;

Fig. 4 represents a view in perspective of one of the adjusting standards for the plow bar;

Fig. 5 represents a view in perspective of one of the plow bar supporting brackets.

Referring more particularly to the drawing, the plow frame includes lateral bars 5 and 6 respectively, a front cross connecting bar 7, a rear cross connecting bar 8, a central longitudinally extending bar 9, and suitable transverse braces 10.

Arranged centrally of the frame and extending transversely thereof between the bars 5 and 9 is a shaft 11, which is revoluble in the journals 12, and on which is mounted the tractor or drive wheel 13. The latter is internally geared at 14, and meshing with this internal gear is a pinion 15 carried on a jack shaft 16. The jack shaft is journaled transversely of the frame in bearings 17 and 18 carried by the bars 9 and 6 respectively, and at its end remote from the end on which the pinion 15 is carried, the jack shaft is provided with a pulley wheel 19 adapted to be driven by suitable motor, indicated conventionally in Fig. 1.

The plow bar 20 is arranged alongside of the drive wheel 13, and its forward end is offset laterally from its rear end, said forward end of the bar 20 being pivotally connected as at 21 to the beam 22 of the front plow point 23. This plow point, as shown in Fig. 1, is arranged directly in advance of the wheel 13, so that the wheel may travel in the furrow cut by the leading plow point. The rear portion of the bar 20 is pivotally connected as at 24 to the rear plow beam 25, on which beam the rear plow point 26 is carried. The forward end of the plow beam 22 is adjustably connected to a forward standard 27 by means of a pin 28 which may be extended through any of a series of openings 29 provided in the standard 27, it being understood that the standard is provided with a central slot into which the forward end of the beam 22 extends. The forward end of the rear plow beam 25 is pivotally connected to a yoke 30 which is adjustable by means of a pin 31 and a series of openings 32 on a rear supporting standard 33 carried by the intermediate bar 9 of the frame.

As the plows 23 and 26 cut through the ground in turning the furrows, they drag downwardly on the connecting bar 20. In order to support this bar on the frame of the plow, the adjustable brackets 34 and 35 are provided. The forward bracket 34 is mounted on a block 36 secured to the intermediate frame rail 9, and the rear bracket 35 is adjustably mounted directly on the rail 9. Each of these brackets has an outwardly extending lower hook portion 37, on which the plow bar 20 rests, and the upright portions of the brackets are longitudinally slotted to receive binding bolts or screws 38 carried by the frame of the plow. By loosening the elements 38, the supporting brackets may be raised or lowered, and when the elements 38 are again tightened, the brackets will be secured in adjusted position. By reason of the fact that the plow beams 22 and 25 are pivotally connected to the supporting bar 20, the angle at which the plows 23 and 26 may enter the earth, may be varied, without varying the vertical adjustment of the plows. Furthermore, by adjusting the bar 20 vertically, and at the same time adjusting the connecting points of the beams 22 and 25, with their supporting standards, a corresponding degree, it will be seen that the plows may be adjusted vertically without changing their angle of inclination.

At the forward portion of the machine in front of the drive wheel 13, is arranged a guide wheel 39 carried on a vertical rod 40 pivoted in brackets 41 mounted at the forward end of the frame. The upper portion of the rod 40 is slidably keyed through an opening provided in one corner of a plate 42. Some suitable guide means, indicated conventionally in dotted lines in Fig. 1, is used for turning the shaft 40 about its axis for guiding the machine.

Spaced from the rod 40 and also arranged at the forward end of the machine, is a vertical rod 43 journaled in a bearing 44 and having a bifurcated lower end 45 in which is pivoted a yoke or inverted U-shaped frame 46 carrying a shaft on which the disks 47 are mounted. On the rod 43 above the bearing 44 is arranged an arm 48 for turning the rod, and this arm at its outer end is provided with a series of openings 49. A reach rod engages at one end in one of the series of openings 49, and its other end in one of a series of openings 50 provided adjacent the edges of the plate 42, as indicated in Fig. 1. By thus coupling the plates 42 and arm 48 together, the shaft 43 will be made to move in unison with shaft 40, so that as turns are made by the machine, the disks 47 will be moved on their vertical axis simultaneously with the guide wheel 39. By having the reach rod adjustable in the various openings, the angular relation of the axis of disks 47 with respect to the direction of travel of the vehicle may be readily adjusted.

Arranged on the frame bar 6 adjacent the rear end of the machine is the weight adjusting device. This includes a supporting bar 51 having outturned ends 52 in which a screw 53 is journaled for rotation. The rear end of the screw is provided with crank means 54 whereby the screw may be manually rotated. A traveler 55 is mounted on the screw, and provided with an opening 56 through which the supporting bar 51 slidably extends. The traveler 55 carries a spindle 57 on which an adjusting wheel 58 is journaled. This wheel rolls along the unplowed surface of the ground, and by turning the screw 53 in one direction or another, the wheel may be shifted toward the forward end of the machine or toward the rear end thereof, for moving the weight rearwardly or forwardly respectively, whereby to adjust the depth at which the rear or the front plow will cut relatively to the other. By thus adjusting the weight of the machine, the disks 47 may be made to cut deeper or shallower as the case may be.

The supporting bar 51 is adjustable bodily vertically on plates 59 secured to the bar 6. These plates are provided with vertical slots 60 for slidably receiving pins 61 carried by the supporting bar 51. Nuts or other tightening devices on the pins 61 serve to tighten the supporting bar in vertically adjusted position. By adjusting the wheel 58 vertically, the weight of the vehicle may be shifted laterally thereof, and a greater or less amount of the weight thus placed upon the driving wheel 13.

The disks 47 are cushioned by means of a coiled spring 65 inserted between the bearing 44 and head 45 and mounted on the rod 43.

Means for raising and lowering the guide wheel 39, for adjusting the depth to which the disks will cut, is provided in the nature of a lever 66 mounted on a toothed segment 67, and connected by means of a link 68 with a suitable collar 69 carried by the rod 40. A spring 70 interposed on the rod between the collar 69 and the plate 42, serves to retain the latter in proper position.

Although I have described the preferred embodiment of my invention, I may desire to make such changes in the construction, combination and arrangement of parts thereof, as do not depart from the spirit of the invention, and the scope of the appended claims.

I claim:—

1. In a plow, the combination of a frame, a driving wheel journaled centrally of the frame adjacent one lateral edge thereof, means for rotating the driving wheel, plows arranged in advance of and at the rear of the driving wheel, means for adjusting the plows vertically and angularly, a guide wheel arranged in advance of the drive wheel, an adjusting wheel arranged on the opposite side of the frame from the driving wheel, and means whereby said adjusting wheel can be adjusted longitudinally and vertically with respect to the frame.

2. In a plow, the combination of a frame, a ground engaging drive wheel journaled in the frame, means for rotating the drive wheel, a supporting bar, plow beams pivotally connected to said supporting bar in advance of, and at the rear of, the driving wheel, plows carried by said plow beams, standards mounted on the frame and to which the plow beams are adjustably connected, and supporting brackets carrying the weight of the said bar and adjustably mounted on the frame.

3. In a plow, the combination of a frame, a ground engaging drive wheel journaled thereon, means for rotating the drive wheel, plows adjustably carried by the frame, a ground engaging adjusting wheel spaced from the drive wheel, a traveler on which the adjusting wheel is journaled, a supporting bar on which the traveler is guided, a screw carried by the supporting bar for shifting the traveler longitudinally thereof, and means whereby the supporting bar may be adjusted relatively to the frame.

4. In a plow, the combination of a frame, plows carried thereby, a ground engaging drive wheel journaled on the frame adjacent one side thereof, and adjusting means carried by the frame adjacent its other side and engageable with the ground, and means whereby the adjusting means may be moved longitudinally and vertically with respect to the frame, for shifting the weight of the frame.

CHARLES MOSS DODSON.

Witnesses:
S. W. WINN,
W. A. DOWNING.